United States Patent Office 3,842,026
Patented Oct. 15, 1974

3,842,026
AROMATIC PART-CURED POLYIMIDE
MOULDING POWDERS
David Rodney Dixon, Dunstable, England Cecil Nigel
Turton, Darien, Conn., and Ian Gabriel Williams,
Welwyn Garden City, England, assignors to Imperial
Chemical Industries Limited, London, England
No Drawing. Continuation-in-part of abandoned application Ser. No. 132,185, Apr. 7, 1971. This application Mar. 22, 1972, Ser. No. 236,975
Claims priority, application Great Britain, Apr. 17, 1970, 18,473/70; June 18, 1970, 29,625/70; Nov. 4, 1970, 52,446/70; Feb. 16, 1971, 4,725/71; Aug. 16, 1971, 38,289/71; Canada, Mar. 30, 1971, 109,141
Int. Cl. C08g 20/32, 51/44, 51/46
U.S. Cl. 260—30.8 R
14 Claims

ABSTRACT OF THE DISCLOSURE

A process for making a polyimide moulding powder comprising reacting acidic and amine reactants at a temperature above 200° C. in the presence of a high boiling dipolar aprotic solvent having a boiling point of at least 200° C. and a melting point of at least 0° C. until the polymer produced has an "available weight loss" of between 2 and 15%.

---

This application is a continuation-in-part of application Ser. No. 132,185, filed Apr. 7, 1971, now abandoned.

This invention relates to improvements in the manufacture of aromatic polyimides for use as moulding powders and is concerned with a process in which the raw materials are reacted together in a solution process to give a part-cured polyimide prepolymer.

According to the invention there is provided a process for the manufacture of a part-cured polyimide prepolymer comprising heating (a) a mixture of at least one aromatic acidic monomer with at least one aromatic amino compound or (b) an aromatic amino carboxylic compound at a temperature of at least 200° C. in the presence of a dipolar aprotic solvent having a boiling point of at least 200° C. and a melting point of at least 0° C. until the "available weight loss" (as hereinafter defined) of the product is between 2 and 15%, wherein said aromatic acidic monomer comprises (i) an aromatic tetracarboxylic acid or the corresponding tetracarboxylic dianhydride or di- or tetra-esters derived therefrom or (ii) an aromatic tricarboxylic acid or the corresponding tricarboxylic anhydride or the mono-, di- or tri-esters derived therefrom, said tetracarboxylic acid having its carboxylic groups arranged in pairs with each pair of carboxylic groups being attached to adjacent nuclear carbon atoms or being in a peri relationship to one another and said tricarboxylic acid having two of its carboxyl groups in ortho or peri relationship, said aromatic amino compound has the general formula

Z—CO—NH—R$^I$—NH—CO—Z' and wherein said aromatic aminocarboxylic compound has the general formula

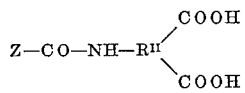

or is the corresponding dianhydride, mono- or di-ester thereof; in which formulae R$^I$ is a bivalent radical of aromatic character, R$^{II}$ is a tervalent radical of aromatic character with carboxyl groups in ortho or peri relationship, —CO—Z and —CO—Z' are acyl groups or Z and Z' are groups of the formula —OR$^{III}$ wherein R$^{III}$ is a monovalent aliphatic or aromatic radical free from terminal or pendent methylene groups.

By the term dipolar aprotic solvent is meant a solvent with a high dielectric constant (e.g. greater than 15) which although it may contain hydrogen atoms is unable to donate suitably labile hydrogen atoms to form strong hydrogen bonds with an appropriate species.

The purpose of only partially reacting the mixture rather than preparing a fully cured polyimide is to allow the production of a part-cured polyimide prepolymer having sufficient melt flow to permit the moulding of shaped articles. The degree of part-cure can be determined in relation to the further weight loss that a sample of the part-cured material will undergo on being fully cured. This further weight loss that a part-cured prepolymer will undergo on full curing is called the "available weight loss." It has been found that if the "available weight loss" of the powder is less than 2% the powder has insufficient melt flow to permit satisfactory moulding. Similarly if the "available weight loss" of the powder is greater than 15% compacts formed from the moulding powders show a tendency to blistering and loss of form during subsequent post-curing or sintered.

Examples of suitable tetracarboxylic acids that may be used in the production of the polyimide are pyromellitic acid; acids derived from fused aromatic systems, as in naphthalene-2,3,6,7-tetracarboxylic acid, naphthalene-1,2,5,6-tetracarboxylic acid, naphthalene - 1,4,5,8 - tetracarboxylic acid and perylene-3,4,9,10-tetracarboxylic acid; and acids wherein the acidic groups are attached to different benzene rings which are linked together, as in biphenyl-3,3',4,4' - tetracarboxylic acid, biphenyl-2,2',3,3'-tetracarboxylic acid, 2,2-bis-(3,4 - dicarboxyphenyl) propane, bis-(3,4-dicarboxyphenyl) ether, bis-(3,4-dicarboxyphenyl) sulphone, benzophenone-2,2',3,3'-tetracarboxylic acid and benzophenone-3,3',4,4'-tetracarboxylic acid.

Acids of the aforementioned types but containing one or more suitable substituent groups, e.g. halogens, as in certain of the dichloro- and tetrachloro-naphthalene derivatives, may be used if desired.

Tetracarboxylic acids containing heterocyclic rings of aromatic character which may be used include those derived from furane, thiophene, pyridine and pyrazine compounds, e.g. thiophene-2,3,4,5-tetracarboxylic acid and pyrazine-2,3,5,6-tetracarboxylic acid.

It is preferred to use the dianhydride or corresponding di- or tetra-ester of such acids in place of the acid itself. We particularly prefer to use pyromellitic dianhydride, benzophenone-3,3',4,4'-tetracarboxylic dianhydride, the dianhydrides of naphthalenetetracarboxylic acids, and mixtures thereof.

Where the acidic monomer is a tricarboxylic acid or derivative thereof, all three carbonyl groups may be attached to the same ring, as in trimellitic acid or hemimellitic acid, or they may be attached to different rings as in naphthalene-2,3,6-tricarboxylic acid, naphthalene-1,2,5-tricarboxylic acid, naphthalene-1,2,6-tricarboxylic acid, naphthalene-1,5,8-tricarboxylic acid and the like, or in tricarboxylic acids of the formula

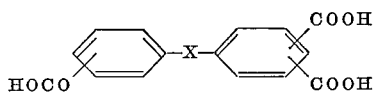

where the two carboxyl groups on the same ring are ortho to each other; X is a direct link or a bridging radical, for example —O—, —S—, —SO—, —SO$_2$—, —CO—, —CO.NH—, or an alkylene (e.g. —CH$_2$— or

—C(CH$_3$)$_2$—)

radical.

For example, the cyclic monoanhydride of benzophenone-3,4,4'-tricarboxylic acid may be used.

Trimellitic anhydride

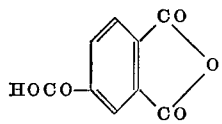

is the preferred aromatic tricarboxylic acid derivative because it is readily available and gives polymers of good physical properties.

The amino compounds of formula $$Z-CO-NH-R^I-NH-CO-Z'$$

are derived from aromatic diamines of formula $$NH_2-R^I-NH_2$$

where $R^I$ is a bivalent aromatic radical.

Examples of suitable diamines are m- and p-phenylenediamines, 2,2-bis-(4-aminophenyl)propane, bis-(4-aminophenyl)methane, benzidine, bis-(4-aminophenyl) sulphide, bis-(4-aminophenyl) sulphone, bis-(4-aminophenyl) ether, 1,5-diaminonaphthalene, 3,3'-dimethylbenzidine, 3,3' - di-methoxybenzidine, 4,4'-diaminobenzanilide and 2,6-diaminopyridine. Bis-(4-aminophenyl) ether and bis-(3-aminophenyl) and bis-(4-aminophenyl sulphones are very suitable and may be used in combination if desired.

Suitable derivatives of these diamines include the acyl or urethane derivatives. Preferred examples of the acyl derivatives include the formyl, acetyl, butyryl and benzoyl derivatives.

In the subsequent reaction to form the polyimide, a carboxylic acid is eliminated and it has been found that the volatility of the eliminated reaction product determines the rate of polymerisation. Thus when, for instance, an aromatic dianhydride is reacted with a diacyl derivative of an aromatic diamine, the reaction proceeds very rapidly in the case of diformyldiamines and diacetyldiamines but quite slowly in the case of, for example, dibutyryldiamines and dibenzoyldiamines because of the higher volatility of formic acid compared with higher molecular weight acids. The use of benzoyl derivatives of aromatic amines however may be useful for the formation of aromatic terminal groups to polymers principally prepared from other acyl derivatives of aromatic amines since the benzoyl derivatives are known to react only very slowly.

When urethane derivatives of the diamines are used it has likewise been found that the lower the molecular weight of the radicals Z and Z' the more rapid is the reaction of component (i) and (ii) to form the prepolymer and then the polyimide. For this reason urethanes of the formulae $$CH_3O-CO-NH-R^I-NH-CO-OCH_3,$$
and
$$C_2H_5O-CO-NH-R^I-NH-CO-OC_2H_5$$

are generally preferred. However, it is sometimes desirable to retard the completion of polyimide ring-closure, for example to retain the coherence of the composition during the curing step, and for this purpose at least some of the radicals Z and Z' may be of higher molecular weight. The phenols or higher alcohols released from such urethane groups may also have an advantageous plasticising effect on the prepolymer during its conversion into polyimide. Thus urethanes containing higher groups such as phenoxy and isooctyloxy may be used, and can be mixed in any desired proportion with the quicker-reacting lower urethanes.

Preferred products are produced on heating bis-(4-acetamidophenyl)methane or bis-(4-acetamidophenyl) ether or N,N'-diacetyl-m-phenylenediamine or a mixture thereof with benzophenone-3,3',4,4'-tetracarboxylic dianhydride and/or pyromellitic dianhydride.

The proportions of the reactants may be varied within quite wide limits from substantially equimolar proportions to a ratio of 2:1 of acidic reactant to amine reactant. In a preferred process the acid reactant and the amine reactant are present in substantially equimolar proportions.

The high-boiling dipolar aprotic solvent may be any material of the type described which has a boiling point, measured at atmospheric pressure, of greater than 200° C., is thermally stable at the reaction temperature employed, is chemically inert towards the reactants, maintains the part-cured product in solution at the reaction temperature employed, and is a solid at temperatures above 0° C. Preferred solvents are diphenyl sulphone, a ditolyl sulphone, benzophenone, and mixtures thereof.

The concentration of high-boiling dipolar aprotic solvent may be varied over a wide range. The upper limit of this range is determined by the reaction rate of the chosen reactants. In general, the reaction rate becomes unacceptably slow when the concentration of solvent is greater than 80% by weight of the weight of the total reaction mixtures. The lower limit of the solvent concentration which can usefully be employed is determined mainly by the requirement that the reactants should be completely soluble at the particular reaction temperature employed but also by the requirement that the reaction mixture should not become so viscous that it becomes difficult to stir the reaction mixture. Control of the reaction temperature is thereby maintained and as a consequence the product produced has reproducible properties. In general, concentrations of solvent as low as 40% by weight of the total weight of the mixture may be used without substantial difficulties arising.

The process of the present invention proceeds smoothly in solution above 200° C. with the elimination of a carboxylic acid or a carboxylic ester if the acidic reactant is an ester. On prolonged heating an intractable polyimide is formed. By controlling the extent of the reaction so that the "available weight loss" of the product is between 2 and 15% a product is obtained which can be processed into a free-flowing powder which can be readily fabricated into shaped articles by techniques described hereinafter. The course of the reaction may be followed, for example, by comparison of the weight loss due to the evolution of carboxylic acid or ester with the theoretical weight loss. Alternatively the course of the reaction may be determined by measuring the "available weight loss."

After the required degree of cure has been reached the solution of part-cured polymer may be cooled to ambient temperature to substantially prevent further reaction. If the melting point of the solvent is above the ambient temperature cooling of the solution results in a mixture of two solid phases. The solid solvent may be extracted using a suitable liquid which is a solvent for the high-boiling dipolar aprotic solvent. Solvents for the extraction of the high-boiling dipolar aprotic solvent used in the process may be chosen from materials which are good solvents for the high-boiling dipolar aprotic solvent but which are nonsolvents or very poor solvents for the polymer formed in the process. Suitable materials are methanol, acetone, ethyl acetate, benzene and xylene.

The extraction of the dipolar aprotic solvent from the solid mixture of solvent and polymer is carried out most easily after the solid mixture has been ground to a small particle size. It has been found that it is possible to comminute the solid mixture at this stage of the process to granules of the size found to be most suitable for use in an ultimate moulding operation.

Thus, granules in the range 180 microns to 500 microns are first produced by any suitable method of comminution and are then subjected to continuous liquid extractions to remove the dipolar aprotic solvent. The resulting product consists of porous polymer particles having a particle size substantially in the range 180 to 500 microns. This product is a free-flowing powder which readily compacts to mouldings having a high degree of "green strength," that is, before curing or subsequent sintering the compacted mouldings have good strength to enable handling without risk of damage.

The process of producing the polymer by part-curing in a high-boiling dipolar aprotic solvent offers several advantages over a part-curing process carried out using the same raw materials in bulk form. For example, the process of part-curing in the solvent results in much lower viscosities being obtained with a consequent reduction in the power and complexity of the apparatus needed to adequately stir the mixture. Additionally the part-cured product may be readily obtained as a free-flowing powder thus avoiding the problem of agglomerating the very fine powder produced from the bulk process into granules of suitable size. Still further the porous granules have greater "green strength" and are less likely to be subject to the problem known as "mould cracking."

The term "green strength" describes the strength of the compacted shaped article when moulded from the powder prior to the steps of fully curing and sintering the article. The "green strength" is conveniently assessed by measuring the flexural strength of the compact.

The term "mould cracking" describes the phenomenon of fine cracks which sometimes appear in a large compact after it is ejected in the "green" state from the mould. Surprisingly it has been found that the porosity of fully cured mouldings made from the part-cured products of the solvent process is lower than those made from part-cured products of the same materials prepared in the bulk form.

At any suitable stage the product may be mixed with additives such as fillers (to improve mechanical or electrical properties or to give a cheaper product), foaming agents, antioxidants, lubricants and processing aids. In particular, the addition of graphite powder having preferably similar granular size to that of the polyimide provides a moulding powder from which can be fabricated bearing materials having better wear performance with the production of less frictional heat than corresponding bearings made from unfilled polyimide moulding powder. Other solid lubricants such as molybdenum bisulphide, poly(tetrafluoroethylene) and bronze can be used to improve frictional characteristics. The incorporation of fibrous fillers such as, for example, glass fibre, carbon fibre and asbestos can result in an increase in the modulus of the moulded article.

When using poly(tetrafluoroethylene) as a filler particularly good results are obtained by using a lubricant grade of poly(tetrafluoroethylene) powder. By the term lubricant grade of poly(tetrafluoroethylene) powder is meant a poly(tetrafluoroethylene) powder of average particle size less than 20 $\mu$m. (as measured optically) prepared by degradation and comminution of a high-molecular-weight form of poly(tetrafluoroethylene) until its melt viscosity at 380° C. is less than $10^6$ poise. An example of a commercially available dry lubricant powder is "Fluon" L169 (Imperial Chemical Industries Limited) which has a melt viscosity of the order of $4 \times 10^5$ poise and an average particle size of the order of 5$\mu$m.

The poly(tetrafluoroethylene) may be blended with the part-cured polyimide prepolymers of this invention by dry tumbling or any convenient method of mechanical mixing. Typical blends contain up to 50% of poly(tetrafluoroethylene) by volume of the total volume of the blend.

In a preferred process for incorporating additives such as fillers the additive may be present from the start of the process. For example, graphite or "Fluon" L169 may be added with the high-boiling dipolar aprotic solvent. Surprisingly, the part-cured mixture may be pulverised and the dipolar aprotic solvent extracted without any substantial loss of the filler. Any suitable filler may be used in the process providing that it is not adversely affected by the reactants.

As indicated previously materials suitable for moulding powders are produced according to this process when the "available weight loss" of the polymers is controlled to be within the range 2–15%. For the production of moulded polyimide articles at temperatures of between 240° C. and 400° C. at pressures of greater than 3MNm.$^{-2}$ (3 meganewtons per square meter), the part-cured prepolymers of the invention should have an "available weight loss" of no more than 6% (preferably no more than 5.5% and desirably no more than 5%) and no less than 2% (preferably no less than 3%). If mouldings are to be formed at ambient temperatures at pressures of up to 700 MNm.$^{-2}$ followed by sintering, then the "available weight loss" of the part-cured prepolymer should be no more than 8% (preferably no more than 7%) and no less than 3% (preferably no less than 4%). If a cellular moulding is to be formed, then the "available weight loss" should be no more than 15% (desirably no greater than 10% and preferably no greater than 9%) and no less than 5.5% (preferably no less than 6%).

For the production of moulded polyimide articles the part-cured prepolymer of the invention (preferably in the form of a free-flowing powder) may be fed into a mould made from any suitable material known in the art; stainless steel or chromium-plated moulds are preferred. For moulding under high temperature low-pressure moulding conditions, mould pressures of greater than 3 MNm.$^{-2}$ at temperatures between 240° C. and 400° C. should be used for up to 45 minutes. A preferred range of temperatures is 250–350° C.

The shear strength of the sintered moulding depends upon the moulding pressure, and very high pressures of up to 100,000 p.s.i. (700 MNm.$^{-2}$) at ambient temperature can be used in order to produce sintered mouldings having a shear strength approximating to those of polyimide mouldings produced by hot compression techniques at lower moulding pressures.

A very suitable method of moulding the part-cured prepolymers of the invention as granules, powder or agglomerates is isostatic or hydrostatic compaction. Conventional equipment may be used for the compaction. The method is particularly useful for the moulding and/or coating of irregular shapes. The method can be used at ambient temperatures or temperatures up to 400° C. and the part-cured polyimide prepolymer is selected as appropriate for the moulding temperature. Adequate compaction pressures (for example, up to 700 MNm.$^{-2}$) are available using the isostatic compaction technique. The mouldings so produced at ambient temperatures have generally satisfactory shear strength on sintering.

After moulding the product should be finally post-cured by sintering at temperatures of up to 450° C. in order to improve the mechanical properties. The process of sintering mouldings may be carried out in any oven capable of providing a temperature of up to 450° C.; a preferred post-curing cycle is 150° C. increasing to 300° C. over 5 hours. The sintering process may be carried out in an atmosphere of air, but the use of an inert atmosphere (e.g. nitrogen) can result in the mouldings having improved mechanical properties and reduced porosity. The mouldings may be sintered in a free state or clamped between plates, preferably made from stainless steel. Mouldings made by the isostatic compaction technique are usually sintered in the free state.

For the production of a moulded polyimide foam from a product according to the invention, part-cured prepolymer is substantially freed from the dipolar aprotic solvent, is placed in a mould and is further heated in an oven, preferably in an inert atmosphere (e.g. nitrogen) to a temperature of up to 400° C. for up to 15 hours. The resultant polyimide moulding has a regular foam structure, finely reproducing the shape of the mould.

Polyimide foams possess the technical advantages over the more common thermoplastic foams of resistance to heat, fire and oxidation. Because of the high glass transition temperature of the polyimide resin, a foam manufactured therefrom may be machined and shaped without taking precautions to prevent local heating which are required when fabricating other thermoplastic materials. The polyimide foams may be used in high-temperature electrical and thermal insulator applications, high-temperature filters and high-temperature mechanical applications.

The following examples illustrate the invention.

EXAMPLE 1

Bis-(4-aminophenyl) methane (3.36 kg.) was dissolved in acetone (about 4 litres) and was then added to a mixture of acetic acid (3.7 kg.) and acetic anhydride (7.0 kg.) over a period of about 1 hour. Benzophenone-3,3',4,4'-tetracarboxylic dianhydride (5.45 kg.) and diphenyl sulphone (15 kg.) were added to the reaction mixture and the mass was then heated over 3 hours 20 minutes to 250° C. During this time acetone, acetic acid and excess acetic anhydride were distilled from the mixture. The mixture was further heated at 250° C. for 4 hours during which time the bis-(4-acetamidophenyl) methane and the benzophenone-3,3',4,4'-tetracarboxylic dianhydride continued to react, evolving acetic acid. The mixture was then cooled and the solid mixture of part-cured polyimide and diphenyl sulphone was milled to produce granules within the range 180 to 500 microns. This finely divided product was then extracted continuously for 16 hours with ethyl acetate to remove the diphenyl sulphone. After extraction the particle sizes of the granules were essentially still within the size range 180 to 500 microns. The granules were sufficiently robust to be handled but under moderate pressure they disintegrated to a powder of fine particle size. The "available weight loss" of this product was 5%.

A sample of the granules was compacted in the cold at 154 MNm.$^{-2}$ and then sintered in an atmosphere of nitrogen by heating from 110° C. to 350° C. by increasing the temperature at 30° C. per hour. The sintered moulding had a Charpy unnotched impact strength of 8 kJm.$^{-2}$ (8 kilojoules per square meter).

In a comparative experiment the green strengths of products of this example were compared with products prepared by part-curing the same strating materials in a bulk process. The solvent cured material had a flexural strength of 7 MNm.$^{-2}$ whereas the bulk cured product gave a value of about 2 MNm.$^{-2}$.

In a further comparative experiment fully sintered mouldings were prepared as described above using the products of this example and also using the products prepared by part-curing the same materials in a bulk process. The porosity of the mouldings produced were compared by the following procedure. Sintered moulding from each of the two products were completely immersed in "Ardrox" penetrant dye (supplied by Ardrox Limited) for 8 hours. After this period the samples were removed and excess penetrant dye was removed from sample surface. The samples were then cut in half. Visual examination showed that the dye had penetrated the sample made from the bulk cured product to a considerable extent, whereas the solvent cured materials were almost completely impervious to the dye.

EXAMPLE 2

Bis-(4-aminophenyl)methane (0.9 kg.) was added over a period of 35 minutes to a mixture of acetic acid (1.05 kg.) and acetic anhydride (2.18 kg.). Diphenyl sulphone (3 kg.), benzophenone-3,3',4,4'-tetracarboxylic dianhydride (1.61 kg.) and "Fluon" L169 (0.6 kg.) (a dry lubricant grade of poly(tetrafluoroethylene) marketed by Imperial Chemical Industries Limited) was added and the mixture was heated with stirring to 250° C. During this heating period the acetic acid and acetic anhydride were distilled off. The mixture was further heated at 250° C. for 2 hours. After cooling the mixture was treated as described in Example 1. The available weight loss of the filled product, which contained 20% by weight of poly(tetrafluoroethylene) and 80% by weight of polyimide when fully cured, was 3.7%, corresponding to 4.6% for the polyimide component. A compact was made at 154 MNm.$^{-2}$ at ambient temperature and then sintered by heating in nitrogen at 350° C. The Charpy unnotched impact strength was found to be 4.7 kJm.$^{-2}$.

EXAMPLE 3

The procedure of Example 2 was repeated except in that the "Fluon" L169 was replaced by synthetic graphite (0.43 kg.; Grade 9901, having a particle size less than 40 microns, supplied by Susgra Limited). After heating to 250° C. to remove acetic acid and acetic anhydride the mixture was heated for 2 hours 45 minutes at 250° C. The available weight loss of the filled product, which contained 15% by weight of graphite and 85% by weight of polyimide when fully cured, was 4.5%, corresponding to 5.3% for the polyimide component. Sintered mouldings were prepared as described in the previous examples. The mouldings were found to have the following properties:

Density _____ g./ml__ 1.31
Flexural modulus_____ MNm.$^{-2}$__ 60
Flexural strength_____ GNm.$^{-2}$__ 3.2
Compressive strength_____ MNm.$^{-2}$__ 200
Charpy unnotched impact strength _____ kJm.$^{-2}$__ 4.9

EXAMPLE 4

Bis-(4-aminophenyl)methane (0.9 kg.) was added over a period of 30 minutes to a mixture of acetic acid (1.05 kg. and acetic anhydride (2.18 kg.) Benzophenone (4.5 kg. and benzophenone-3,3',4,4'-tetracarboxylic acid dianhydride (1.61 kg.) were added and the mixture was heated with stirring to 250° C. During this period the acetic acid and acetic anhydride were distilled off. The mixture was further heated at 250° C. for 3 hours. The mixture was then treated as described in Example 1 except that the finely divided product was extracted continuously with acetone for 20 hours to remove the benzophenone. Sintered mouldings prepared as described in the previous examples had a mean Charpy unnotched impact strength at 4.2 kJm.$^{-2}$.

EXAMPLE 5

The procedure of Example 4 was repeated except that di-4-tolyl sulphone (4.5 kg.) was used as the solvent. This solvent was removed from the finely divided reaction product by extraction with hot methanol for 20 hours. Sintered mouldings prepared as previously described had a mean Charpy impact strength of 4.0 kJm.$^{-2}$.

We claim:

1. A process for the manufacture of a part-cured polyimide prepolymer having an "available weight loss" between 2 and 15% comprising heating (a) a mixture of at least one aromatic acidic monomer with at least one aromatic amino compound or (b) an aromatic amino carboxylic compound at a temperature of at least 200° C. in the presence of a dipolar aprotic solvent having a boiling point of at least 200° C. and a melting point of at least 0° C. until the "available weight loss" of the product is between 2 and 15%, thereafter discontinuing said heating and granulating said part-cured polyimide prepolymer, wherein said aromatic acidic monomer comprises (i) an aromatic tetracarboxylic acid or the corresponding tetracarboxylic dianhydride or di- or tetra-esters derived therefrom or (ii) an aromatic tricarboxylic acid or the corresponding tricarboxylic anhydride or the mono-, di- or tri-esters derived therefrom, said tetracarboxylic acid having its carboxylic groups arranged in pairs with each pair of carboxylic groups being attached to adjacent nuclear carbon atoms or being in a *peri* relationship to one another and said tricarboxylic acid having two of its carboxyl group in *ortho* or *peri* relationship, said aromatic amino compound has the general formula $$Z-CO-NH-R^I-NH-CO-Z'$$

and wherein said aromatic aminocarboxylic compound has the general formula $$Z-CO-NH-R^{II}\begin{matrix}\nearrow COOH\\ \searrow COOH\end{matrix}$$

or is the corresponding dianhydride, mono- or di-ester thereof; in which formulae $R^I$ is a bivalent radical of aromatic character, $R^{II}$ is a tervalent radical of aromatic character with carboxyl groups in *ortho* or *peri* relationship, —CO—Z and —CO—Z' are acyl groups or Z and Z' are groups of the formula —$OR^{III}$ wherein $R^{III}$ is a monovalent aliphatic or aromatic radical free from terminal or pendent methylene groups.

2. A process according to claim 1 in which the solvent is diphenyl sulphone, a ditolyl sulphone, benzophenone, or a mixture thereof.

3. A process according to claim 1 comprising the steps of cooling the product below the melting point of the dipolar aprotic solvent used, comminuting the solid obtained to a small particle size and extracting said solvent from the comminuted particles.

4. A process in which a part-cured polyimide prepolymer made according to claim 1 is mixed with a lubricating or fibrous filler.

5. A process according to claim 4 in which the filler is present during the heating process.

6. A process according to claim 5 in which the filler is graphite or poly(tetrafluoroethylene).

7. A process according to claim 1 in which the heating is continued until the "available weight loss" of the product is between 2 and 6%.

8. A process according to claim 1 in which the heating is continued until the "available weight loss" of the product is between 3 and 8%.

9. A process according to claim 1 in which the heating is continued until the "available weight loss" of the product is between 5.5 and 15%.

10. A process of manufacturing moulded polyimide articles in which a part-cured polyimide prepolymer made by a method as claimed in claim 7 is compressed at a temperature in excess of 200° C. and at a pressure in excess of 3 $MNm.^{-2}$ and is subsequently post-cured by sintering.

11. A process of manufacturing moulded polyimide articles in which a part-cured prepolymer made by a method as claimed in claim 8 is compressed at ambient temperature and at a pressure of up to 700 $MNm.^{-2}$ and is subsequently post-cured by sintering.

12. A process of producing moulded articles according to claim 10 in which the sintering is carried out in an inert atmosphere.

13. A process of producing moulded articles according to claim 11 in which the sintering is carried out in an inert atmosphere.

14. A part-cured polyimide prepolymer obtained by the process of claim 1, said part-cured polyimide prepolymer being free-flowing and being further characterized by greater green strength and reduced tendency to mould cracking than the corresponding product obtained by part-curing in the bulk, said part-cured polyimide prepolymer also giving fully cured mouldings of lower porosity than those obtainable from corresponding product made by part-curing in the bulk.

References Cited
UNITED STATES PATENTS

| | | | |
|---|---|---|---|
| 3,607,814 | 9/1971 | Di Leone | 260—30.4 N |
| 3,592,789 | 7/1971 | Bolton | 260—30.8 |
| 3,422,061 | 1/1969 | Gall | 260—47 |
| 3,573,260 | 4/1971 | Morello | 260—78 |
| 3,505,295 | 4/1970 | Grunsteidl | 260—78 TF |
| 3,249,585 | 5/1966 | Gall | 260—47 |
| 3,376,260 | 9/1968 | Fritz | 260—78 TF |
| 3,654,227 | 4/1972 | Dine-Hart | 260—78 TF |

ALLAN LIEBERMAN, Primary Examiner

R. ZAITLEN, Assistant Examiner

U.S. Cl. X.R.

260—32.6 NT, 32.8 N, 78 TF